United States Patent [19]

Santella

[11] Patent Number: 5,375,569

[45] Date of Patent: Dec. 27, 1994

[54] MULTI POLYMER STRUCTURES FOR INTERNAL COMBUSTION ENGINES

[75] Inventor: Joel Santella, Ferndale, Mich.

[73] Assignee: General Electric Company, Pittsfield, Mass.

[21] Appl. No.: 190,741

[22] Filed: Jan. 26, 1994

[51] Int. Cl.$^5$ .............................................. F01M 9/10
[52] U.S. Cl. ..................... 123/90.38; 123/195 C; 123/198 E
[58] Field of Search ............. 123/90.33, 90.38, 195 C, 123/198 E

[56] References Cited

U.S. PATENT DOCUMENTS

| | | | |
|---|---|---|---|
| 3,773,142 | 11/1973 | Bragg et al. | 123/90.38 |
| 3,913,927 | 10/1975 | Gordon | 123/90.38 |
| 4,492,189 | 1/1985 | Ogawa et al. | 123/90.38 |
| 4,498,433 | 2/1985 | Ogawa | 123/90.38 |
| 4,522,165 | 6/1985 | Ogawa | 123/195 C |
| 4,773,624 | 9/1988 | Affenzeller et al. | 248/638 |
| 4,789,697 | 12/1988 | Affenzeller et al. | 523/437 |
| 5,087,514 | 2/1992 | Graefe | 428/315.5 |
| 5,228,420 | 7/1993 | Furuya et al. | 123/90.38 |
| 5,285,754 | 2/1994 | Bell | 123/90.38 |

Primary Examiner—Raymond A. Nelli
Assistant Examiner—Weilun Lo

[57] ABSTRACT

This invention is directed to multi polymer structures for internal combustion engines, as well as structures for other vehicle drive train parts. For example, a valve rocker cover for an internal combustion engine in accordance with this invention is a composite of at least two different molded thermoplastic resins, which structure comprises a valve cover body molded of a polybutylene terephthalate resin and a sealing flange molded of a polyetherimide resin, with both parts in a bonding relationship. The valve rocker cover can also have attached to the underside a sealent so as to provide a seal between the valve cover and engine block when so assembled. The method of producing a composite in accordance with this invention is either insert molding or coinjection molding.

4 Claims, 3 Drawing Sheets

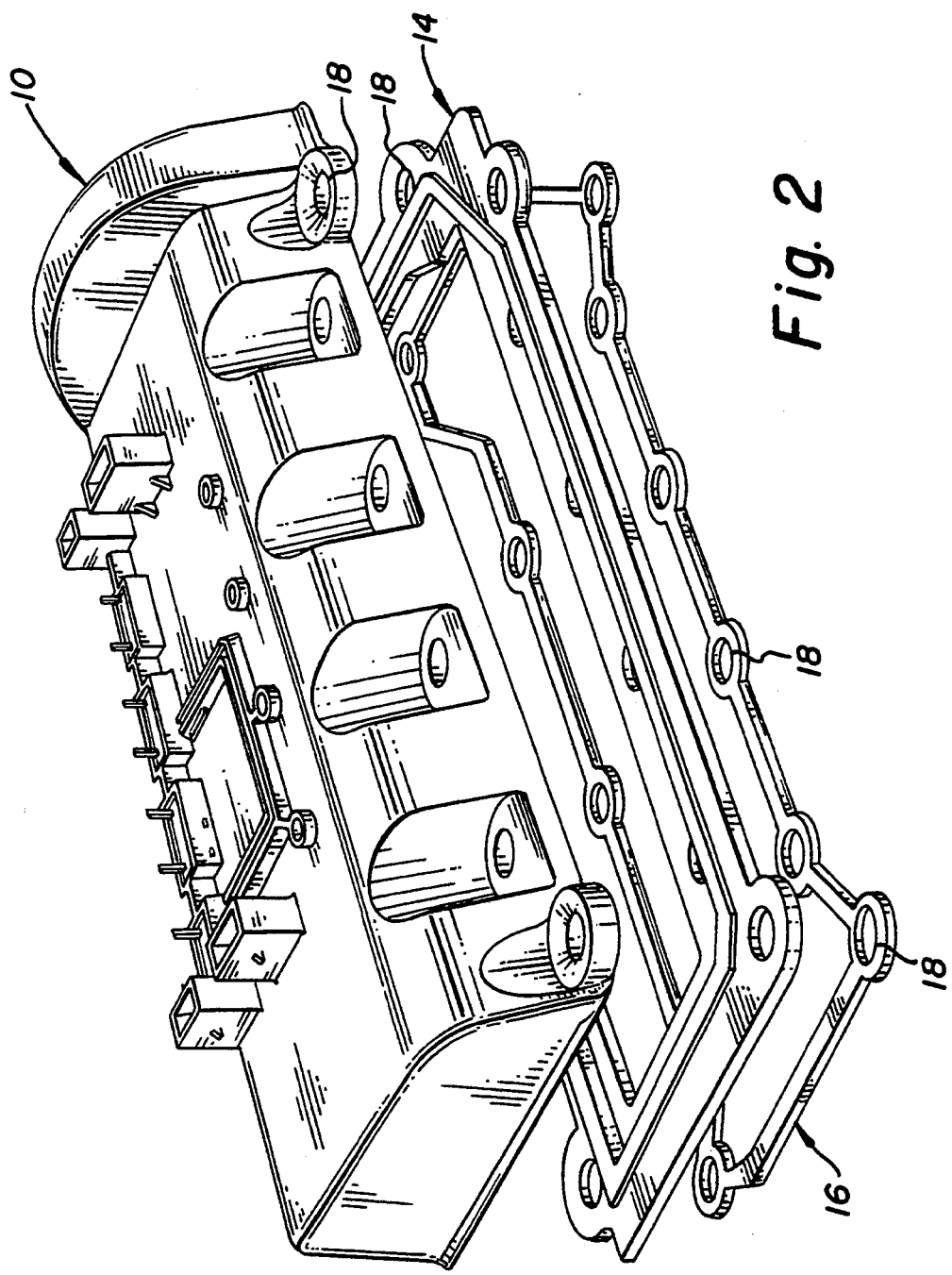

MULTI POLYMER STRUCTURES FOR INTERNAL COMBUSTION ENGINES

BACKGROUND OF THE INVENTION

This invention is directed to particular parts for road and off-road vehicle applications, particularly for internal combustion engines and other drive train parts for such vehicles. The unique construction of such parts of this invention comprise several plastic component parts so united as to form a continuous one piece part.

In the internal combustion engine field, particularly the automotive engine field, certain engines and drive train parts such as valve covers, oil pans, timing gear covers, transmission covers, intake manifold, and pinion gear housings are usually made of metal, and in some particular cases made from certain plastics. However, some of these metal covers or housings have poor sound deadening properties and can warp and/or rust over use requiring refinishing or ultimately new such metal housings. In the case of metal valve rocker covers, the air spout and inside baffle need to be welded to the cover, requiring an additional finishing operation. Even with thermoset molded valve covers, the oil spout and inside baffle need to be cemented or somehow joined to the valve cover, thereby requiring additional finishing operations. Glass filled polyamides (nylon) have also been used for molding such parts and are apparently currently in use, particularly for valve rocker covers. However, nylon, even glass filled nylon, has poor creep resistance, particularly operating at high automotive engine temperatures. Further, the nylons are not dimensionally stable, again, particularly over time at the high automotive engine temperatures.

Because of the need to reduce the overall weight of automotive vehicles, as well as reducing costs and increasing the life of automotive parts, there is a need for lighter weight, longer lasting and cost effective automotive engine parts.

SUMMARY OF THE INVENTION

It has now been discovered that certain parts of the drive train of an internal combustion engine can be made out of different thermoplastic components, the properties of each component adding to the performance of the particular part, such as lighter weight, longer lasting, cost effectiveness, and noise reduction.

Specifically, this invention is preferably directed to an engine valve rocker cover wherein the sealing flange component of the valve rocker cover is molded of one type of thermoplastic resin, and the body of the valve rocker cover is molded of another type of thermoplastic resin. Optionally, the sealing flange may have attached to it a sealing gasket which may be made out of a particular plastic material.

DETAILED DESCRIPTION OF THE INVENTION

Figure 1:
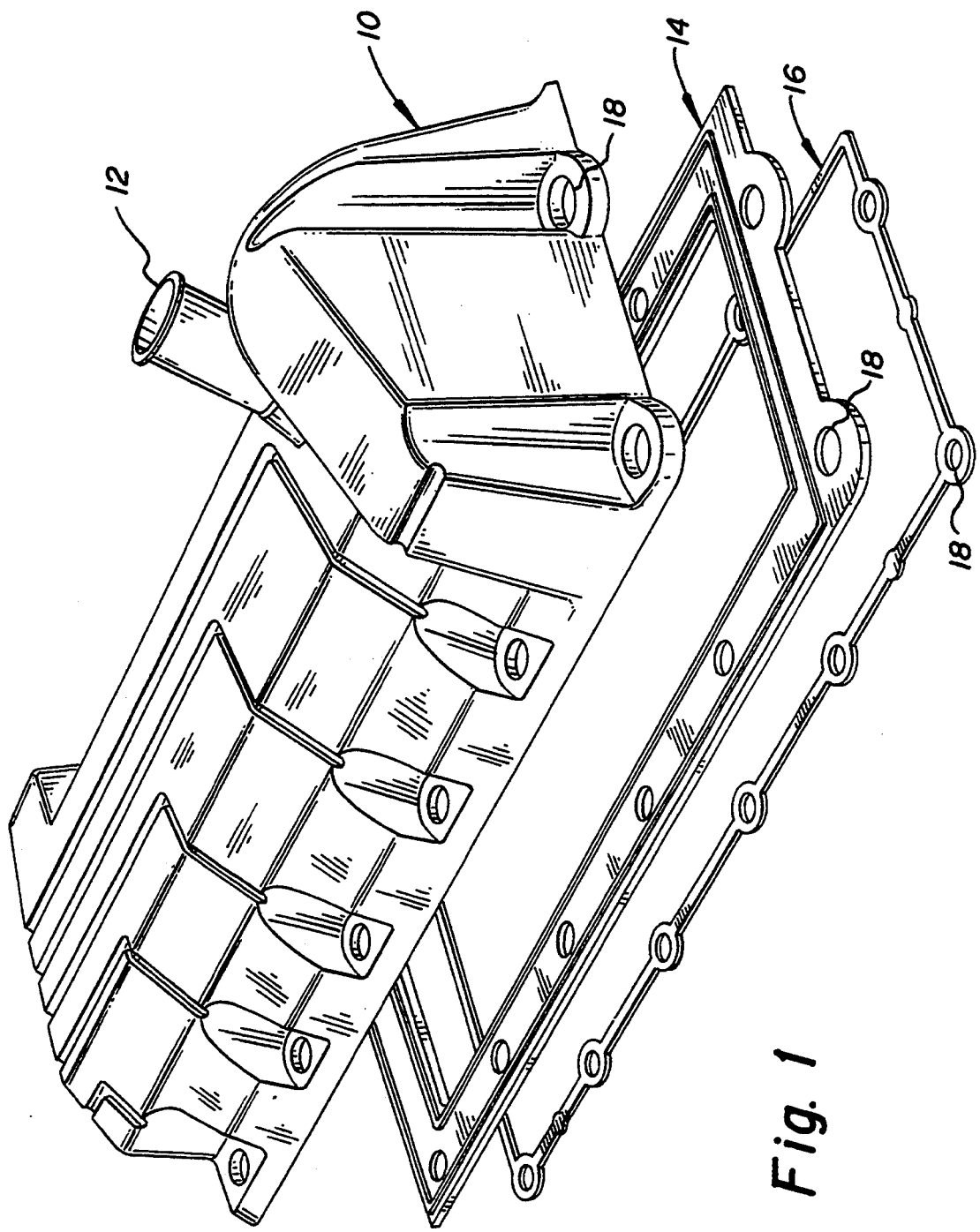

In accordance with the preferred embodiment of this invention, the engine valve rocker cover comprises at least two injection molded parts. The body of the cover is injection molded from a crystalline high temperature thermoplastic resin such as a polybutylene terephthalate resin having an intrinsic viscosity (IV) of at least about 0.40 deciliters per gram as measured in chloroform at 25° C. The sealing flange part of the engine valve rocker cover is injection molded out of a high level creep resistant thermoplastic resin such as a polyetherimide resin. Optionally, an elastomer seal can also be attached to the sealing flange during injection molding of the sealing flange. Thus, the total valve rocker cover as one unit can then be attached to the engine block without the need of an assembler to stock a separate seal gasket along with a valve rocker cover. A typical seal gasket in this case can be a silicone elastomeric polymer. The advantage of the engine valve rocker cover of this invention is that it is lighter weight than a metal valve cover, has better noise reduction than metal, has a higher level of creep resistance as compared to known thermoplastics used, such as nylon, and has better dimensional stability than nylon.

The engine valve rocker cover can be made by coinjection of the thermoplastic resins or by insert injection molding. Insert molding is currently used frequently for electronic applications where a metal insert is placed into an injection molding tool, and plastic is injected around the insert. This provides plastic covering and insulation over the metal insert. To manufacture a multi-material valve cover using the insert molding process, one component of the valve rocker cover would be molded separately. This would most likely be the sealing flange component. This sealing flange component would then be placed in a separate mold. The sealing flange insert is secured by pins built into the mold. This prohibits movement of the insert during the high pressure plastic injection phase. The cover or upper portion of the valve rocker cover would then be molded by injecting the second material around the flange insert. Details on the flange would provide a mechanical interlock between the two materials.

Whereas insert molding uses an insert which has been molded in a separate prior step, coinjection molding forms both materials at roughly the same time. In this process, one component of the valve rocker cover is molded in a vertical press. After the plastic is injected and sufficiently cooled to facilitate ejection from the mold, the mold separates into an upper and lower half. The molded plastic part remains in one half of this mold. A shuttle table allows the mold half without the part to move away and a second mold half to replace it. This third mold half is mated to the remaining mold half which contains the part. More plastic (of a different color or chemical makeup) may now be molded around or encapsulating the first molded part.

In addition, the oil spout and/or baffle that is normally employed with engine valve rocker covers can be molded as part of the valve rocker cover of this invention. This eliminates the additional step of welding or attaching the oil spout and/or baffle to the valve cover.

While this invention has been primarily described in terms of an engine valve rocker cover, other automotive or engine parts can be coinjection molded or insert molded using the appropriate thermoplastic resins having the desired properties to achieve performance, as is achieved with the valve cover of this invention. The specific properties of heat resistance, creep resistance, impact resistance, heat distortion temperature under load, etc., are important properties that can be utilized for the structures of this invention. For example, such structures that can be made utilizing a combination of different thermoplastic resins by coinjection or insert molding are oil pans, transmission housings, timing belt covers, intake manifolds, and pinion gear housings.

The thermoplastic resins that can be employed in the practice of this invention are well known, commercially available thermoplastic resins. Such resins are polybutylene terephthalate resins manufactured and sold under the trademark VALOX ® resins by General Electric Company, Mount Vernon, Ind.; and polyetherimide resins manufactured and sold under the trademark ULTEM ® resins by General Electric Company, Mount Vernon, Ind., polyphenylene ether/polyamide resins manufactured and sold under the trademark NORYL GTX ® by General Electric Company, Selkirk, N.Y., polyphenylene sulfide manufactured and sold under trademark SUPEC ® by General Electric Company, Mount Vernon, Ind., polyether sulfone resins, polyether ether ketone resins, liquid crystal polymer resins, polyaryl sulfone resins, polyamide imide resins and polyphthalamide resins. Such resins can also include blends thereof, as well as including additives therewith such as glass fibers, minerals, impact modifiers, etc. Also available are other grades of such resins having particular molecular weights.

In the engine valve rocker cover described as one embodiment herein, VALOX ® resin (polybutylene terephthalate) is the preferred thermoplastic resin for the cover body and ULTEM ® resin (polyetherimide) is the preferred thermoplastic resin for the sealing flange. The sealing gasket, if employed, is preferably a GE Silicone elastomeric resin, manufactured and sold by General Electric Company, Waterford, N.Y.

DETAILED DESCRIPTION OF THE DRAWINGS

To describe one embodiment of this invention, although not limited to such as disclosed elsewhere in this invention, FIGS. 1 and 2 show two different versions of valve rocker covers consisting of three different components.

FIG. 1 is a graphic drawing of the separate components of a valve rocker cover consisting of the cover body 10 having oil spout 12, sealing flange 14, and sealent 16. All component parts are shown with bolt holes 18.

Figure 1A:
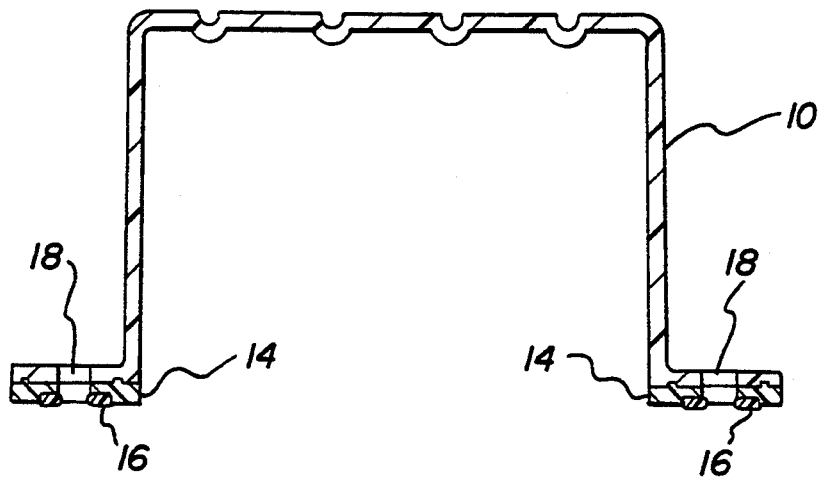

FIG. 1(a) is a cutaway of the injection molded composite of the separate components shown in FIG. 1. The cutaway FIG. 1(a) shows cover body 10, sealing flange 14, sealent 16, and bolt holes 18.

FIG. 2 is a graphic drawing of another valve rocker cover separately showing the individual components of the valve rocker cover. In FIG. 2, 10 is the body of the valve rocker cover, 14 is the sealing flange, 16 is the sealant. Bolt holes 18 are shown in each component.

Figure 2A:
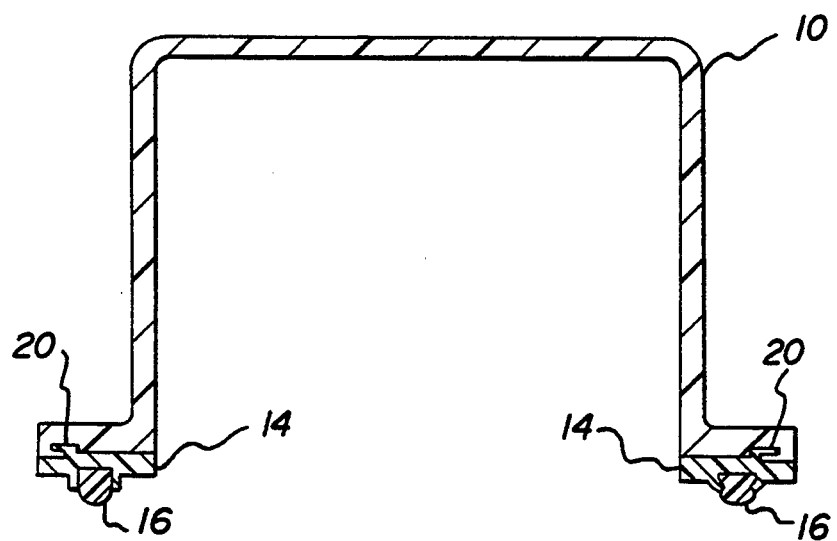

FIG. 2(a) is a cutaway of the injection molded composite valve rocker cover of the separate components shown in FIG. 2. FIG. 2(a) consists of valve rocker cover body 10, sealing flange 14 and sealent 16. Also note that in this cutaway, the sealing flange has securing flange 20 that secures the body cover to the sealing flange. During coinjection molding, the molten thermoplastic for the body of the valve rocker cover encapsulates the securing flange, thereby aiding in the bonding of the body 10 of the valve rocker cover to sealing flange 14.

Obviously, other modifications and variations of the present invention are possible in the light of the above teachings. It is, therefore, to be understood that changes may be made in the particular embodiments described herein, which are within the full intended scope of the invention as defined in the appended claims.

What is claimed is:

1. A thermoplastic molded composite rocker valve cover structure used in combination with a drive train of an internal combustion engine comprising at least two different molded thermoplastic resin components which are in bonding relationship, said rocker valve cover comprising a body of said cover and a sealing flange, said body being polybutylene terephthalate, and said sealing flange being polyetherimide.

2. The molded composite rocker valve cover claim 1 having a sealent attached to the underside the sealing flange so as to provide a seal between the rocker valve cover and an engine block.

3. The molded composite valve cover of claim 2 wherein the sealent is a silicone elastomeric polymer.

4. The molded thermoplastic composite article of claim 1 prepared by the process of coinjection molding.

* * * * *